United States Patent
Wilson et al.

(10) Patent No.: US 6,446,907 B1
(45) Date of Patent: Sep. 10, 2002

(54) HELICOPTER DRIP PAN

(76) Inventors: Thomas Gray Wilson, 359 Rice Hill School Rd., McKee, KY (US) 40447; Joel R. Pitlor, 19 Chalk St., Cambri, MA (US) 02139; Nelson Pitlor, 9796 Ridgewood Dr., Twinsburg, OH (US) 44087

( * ) Notice: Subject to any disclaimer, the term of this patent is extended or adjusted under 35 U.S.C. 154(b) by 0 days.

(21) Appl. No.: 09/533,012

(22) Filed: Mar. 22, 2000

(51) Int. Cl.[7] .............................................. F16N 3/00
(52) U.S. Cl. ................................... 244/17.11; 184/106
(58) Field of Search ............................. 244/1 R, 129.1, 244/17.11, 135 R; 220/326, 806, 378; 184/106, 6.12; 277/598

(56) References Cited

U.S. PATENT DOCUMENTS

| | | | | |
|---|---|---|---|---|
| 2,053,297 A | * | 9/1936 | Nittle | 184/106 |
| 2,383,200 A | * | 8/1945 | Kramer et al. | 244/129.4 |
| 2,475,836 A | | 7/1949 | Henricksen et al. | |
| 3,779,330 A | * | 12/1973 | Longpre | 184/106 |
| 3,971,511 A | | 7/1976 | Casey | |
| 4,394,853 A | | 7/1983 | Lopez-Crevillen et al. | |
| 4,682,672 A | * | 7/1987 | Berger et al. | 184/106 |
| 4,936,483 A | * | 6/1990 | Ballu | 220/378 |
| 5,018,407 A | | 5/1991 | Hoecht | |
| 5,411,116 A | | 5/1995 | Kish et al. | |
| 5,421,474 A | * | 6/1995 | Ramillon et al. | 220/378 |
| 5,531,196 A | * | 7/1996 | Clark | 184/106 |
| 5,544,632 A | | 8/1996 | Choate | |
| 6,112,856 A | * | 9/2000 | Wilson | 184/106 |

* cited by examiner

Primary Examiner—Galen L. Barefoot
(74) Attorney, Agent, or Firm—Wood, Herron & Evans, LLP (57) ABSTRACT

A helicopter drip pan apparatus for covering and sealing a structural opening in a helicopter. The drip pan apparatus includes a frame member adapted to mount to the structural opening of the helicopter. The frame member has an inwardly-facing peripheral surface extending around the frame member. The frame member and thus the surface have at least one linear portion. A drip pan is selectively affixed to the frame member. The drip pan includes an outwardly-facing peripheral groove which extends around the outside edge of the drip pan. Like the surface of the frame member, the groove has at least one linear portion. The perimeter of the drip pan conforms to the surface of the frame member. A seal member is disposed in the groove of the drip pan to sealingly engaging the surface of the frame member against fluid leakage therethrough.

19 Claims, 5 Drawing Sheets

HELICOPTER DRIP PAN

FIELD OF THE INVENTION

This invention relates to a fluid-tight drip pan, and more specifically to a fluid-tight drip pan for the engine or transmission compartment of a helicopter.

BACKGROUND OF THE INVENTION

Helicopters, in general, have the same basic configuration or layout. For instance, a typical helicopter will have a cabin section which is used to transport people, cargo or both. In addition, the helicopter will have an engine compartment which is located typically above and to the rear of the cabin section. The engine compartment will house two primary components, at least one engine and a rotor transmission with a corresponding transmission housing.

Both the engine and the rotor transmission contain numerous fluids, such as petroleum-based lubricants, that are critical to the operation of the engine and the transmission. These fluids inevitably leak from various locations in the engine and the transmission during both the operation and storage of the helicopter. Because the engine compartment is generally oriented above the cabin section, any leaking fluids eventually seep or drip into the cabin section, unless proper sealing mechanisms are in place. The inflow of these leaking fluids spoil, stain or damage the cabin's interior materials such as seat covers and acoustic linings. In addition, the leaking fluids can severely damage or destroy sensitive electronic equipment that may be placed in the cabin section of, for instance, a Blackhawk™ helicopter.

Moreover, the exterior of the helicopter around the engine and transmission compartment is not completely fluidtight, allowing fluid such as water to leak from these areas into the cabin with similar adverse effects.

During routine inspection and maintenance it is necessary to have ready access to the engine and the rotor transmission. Such access is required to check critical fluid levels, to replace worn or damaged parts, or to adjust mechanical systems. Typically, various access panels in or around the engine compartment provide the requisite openings to achieve ready access to the engine and the rotor transmission. In some helicopters, such as the Blackhawk™ helicopter, a forged airframe structure forms an access opening which is located below the rotor transmission housing and above the cabin section. The opening is thus accessible through the cabin's ceiling. This access opening, however, must be sealed by a cover against the inevitable oil and fluid drippings which the engine and the rotor transmission will produce, as well as against water leakage.

The access opening below the engine compartment in the Blackhawk™ helicopter is defined by both the aircraft structural forgings and a flexible or yieldable downwardly-turned skirt which is riveted onto the helicopter's forged structure. The skirt is thin and many times more flexible relative to the helicopter's forged structure.

Prior drip pan designs attached a covering plate directly to the flexible skirt with a hollow seal sandwiched therebetween. One hollow seal used in prior designs resembled the flexible, hollow door seals used around car doors or refrigerator doors. However, the skirt contains surface aberrations, such as the protruding rivet heads from the rivets securing the skirt to the forged helicopter structure. When the seal engaged both the skirt and the rivet heads, it could be upset enough so that leakage occurred. Accordingly, the hollow seal traversing these aberrations while sandwiched between the skirt and the covering plate is unable to provide a suitable, consistent, long-term fluid seal. Moreover, flexing of the flexible skirt could also cause leakage.

Also, the geometry of the cover cannot be such that it protrudes significantly into the interior of the cabin section. Headroom in the cabin section typically is limited and any additional protrusion from the ceiling of the cabin section is undesirable. In addition, because weight is critical to the operation of any aircraft, heavy cover constructions are undesirable.

The drip pan design disclosed in copending U.S. patent application Ser. No. 09/069,920, filed Apr. 30, 1998, which is fully incorporated herein by reference, provided improvements to prior drip pan designs. However, even this drip pan design can be improved upon further, particularly in the area of the seal and the attachment of the drip pan to its attachment frame.

Accordingly, one objective of this invention is to provide an improved cover and seal for the interior access opening of helicopters such as the Blackhawk™ helicopter and those of similar structure.

Another object of this invention is to provide a drip pan that will effectively and consistently seal fluid from passage from an engine or transmission compartment to a cabin section of a helicopter.

Another object of this invention is to provide a drip pan which permits quick access to the engine or transmission compartment of a helicopter without requiring modification to the existing aircraft structure.

Another objective of the invention is to more effectively seal a drip pan to the skirt defining a transmission access opening in a Blackhawk™ helicopter.

Still another object of this invention is to provide a drip pan that can be attached to the existing structure of a Blackhawk™ helicopter without modification of the existing airframe structure and with minimal intrusion into the helicopter's cabin section.

SUMMARY OF THE INVENTION

These and other objects of the invention are provided for by a helicopter drip pan apparatus which covers and effectively seals a structural opening in the helicopter without leakage. According to one embodiment of the invention, the drip pan apparatus includes a frame member adapted to mount to the structural opening of the helicopter. Unlike prior drip pan designs, the frame member may mount directly to the forged structure of the helicopter or to a flexible skirt required by prior designs. The frame member has an inwardly-facing peripheral surface extending around the frame member. The frame member and thus the surface have at least one linear portion. A drip pan is selectively affixed to the frame member. The drip pan includes an outwardly-facing peripheral groove which extends around the outside edge of the drip pan. Like the surface of the frame member, the groove has at least one linear portion. The perimeter of the drip pan conforms to the surface of the frame member. A seal member is disposed in the groove of the drip pan to sealingly engaging the surface of the frame member against fluid leakage therethrough.

In one aspect of the invention, the frame member also has spaced apart slots opening inwardly to an opening defined by the frame member. The drip pan has a plurality of resilient members resiliently engaging the slots to detachably secure the drip pan to the frame member. These resilient members provide a quick and convenient way to install or remove the drip pan without using any hand or power tools.

In another aspect of the invention, the drip pan includes a plurality of access openings to provide ready access to mechanical linkages and fluid level indicators. Removable access covers have peripheral seal members which sealingly engaged the access openings against fluid leakage therethrough. The access covers include resilient members which resiliently engage grooves located in the access openings. These resilient members provide a quick and convenient way to install or remove the access covers without using any hand or power tools.

In still another aspect of the invention, the opening defined by the frame member is transversely disposed or shifted to one side of the frame member. As a result the four frame rails forming the frame member have varying widths. The shift of the opening provides improved access to an oil filter on particular helicopters. To provide even further access, a specific corner section of the frame member is machined or milled down so that the oil filter can be removed along a line not perpendicular to the drip pan.

The drip pan apparatus of the present invention maintains its sealing integrity more effectively than prior drip pan apparatuses. Specifically, the peripherally located seal member continues to sealingly engage the surface of the frame member even when the structural opening and the frame member flexes out of the plane of the drip pan apparatus.

DETAILED DESCRIPTION OF THE INVENTION

Figure 1:
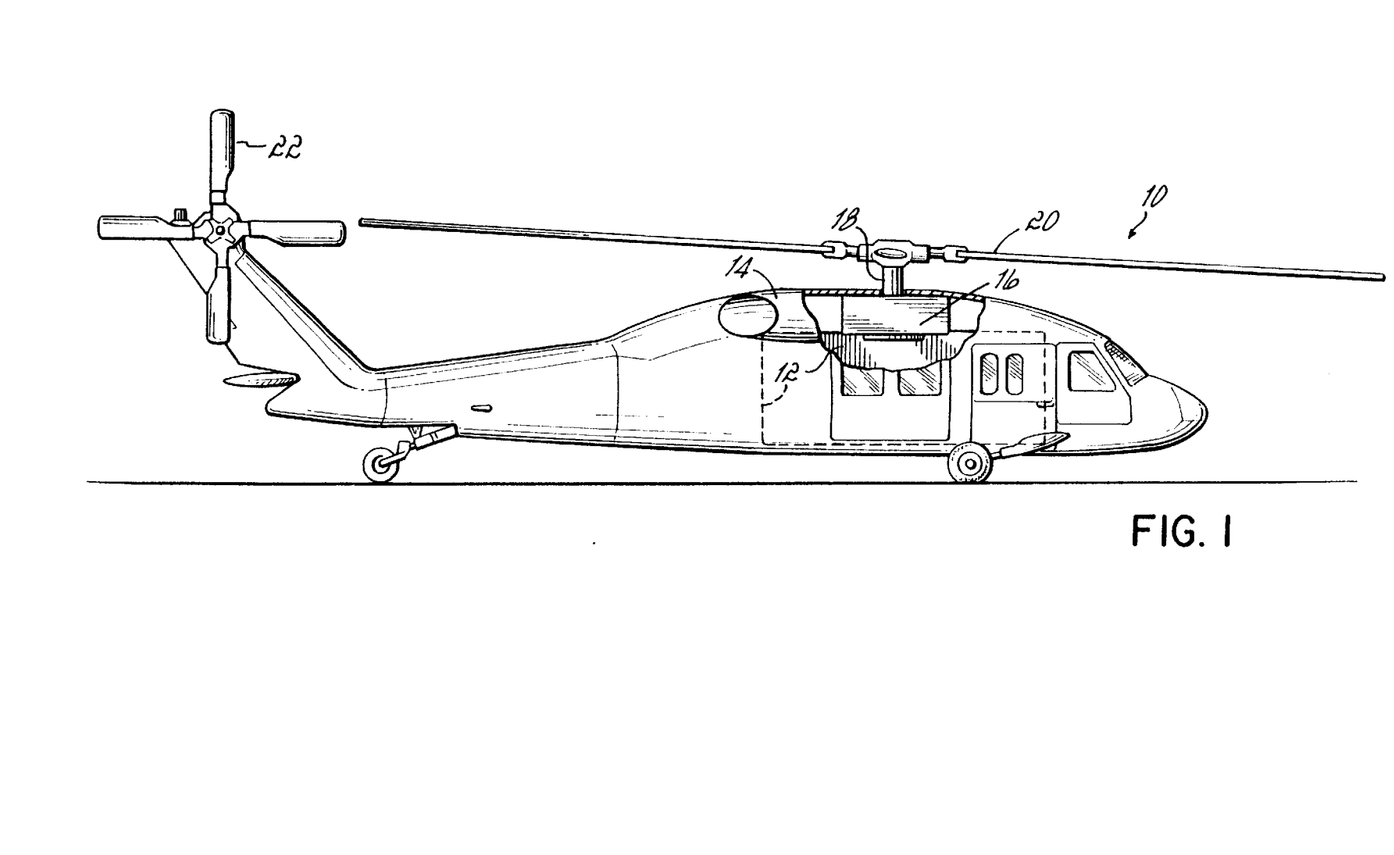
FIG. 1 is a diagrammatic elevational illustration in partial cross section showing orientation of a helicopter, engine, transmission, rotor, and cabin of the type with which the invention is used.

FIG. 1 shows a widely known configuration of a typical helicopter 10. While the typical helicopter 10, for example, in this description is a Blackhawk™ helicopter as manufactured for the United States by Sikorsky Aircraft Company, Stratton, Conn., it will be appreciated that the invention is useful for numerous aircraft and helicopter configurations of other makes and models. In this configuration the helicopter 10 has a cabin 12 (dashed outline) in which passengers, equipment and cargo can ride during operation. Located just above the cabin 12 is at least one engine 14 which supplies power to a rotor transmission 16. The rotor transmission 16 is connected to a shaft 18 which imparts rotary motion to the main rotor 20. The rotor transmission 16 is also connected via a drive shaft (not shown) to a tail rotor 22.

It will be appreciated the rotor transmission 16 requires frequent inspection and maintenance to ensure proper operation of the transmission. To facilitate easy and ready access to the rotor transmission, rotor transmission access openings are provided on both the exterior and interior of the helicopter. For example, structural opening 24 is located within the cabin 12, providing the requisite access to the rotor transmission 16 situated directly above the cabin. Structural opening 24 generally has some type of removable covering to seal the transmission area 16 from the cabin area 12. To accommodate attachment of a removable covering, a flexible skirt 26 (FIG. 2) is fixedly secured around the periphery of structural opening 24 by rivets 28. Skirt 26 is many times more flexible than the structural opening 24 to which it attaches.

Figure 2:
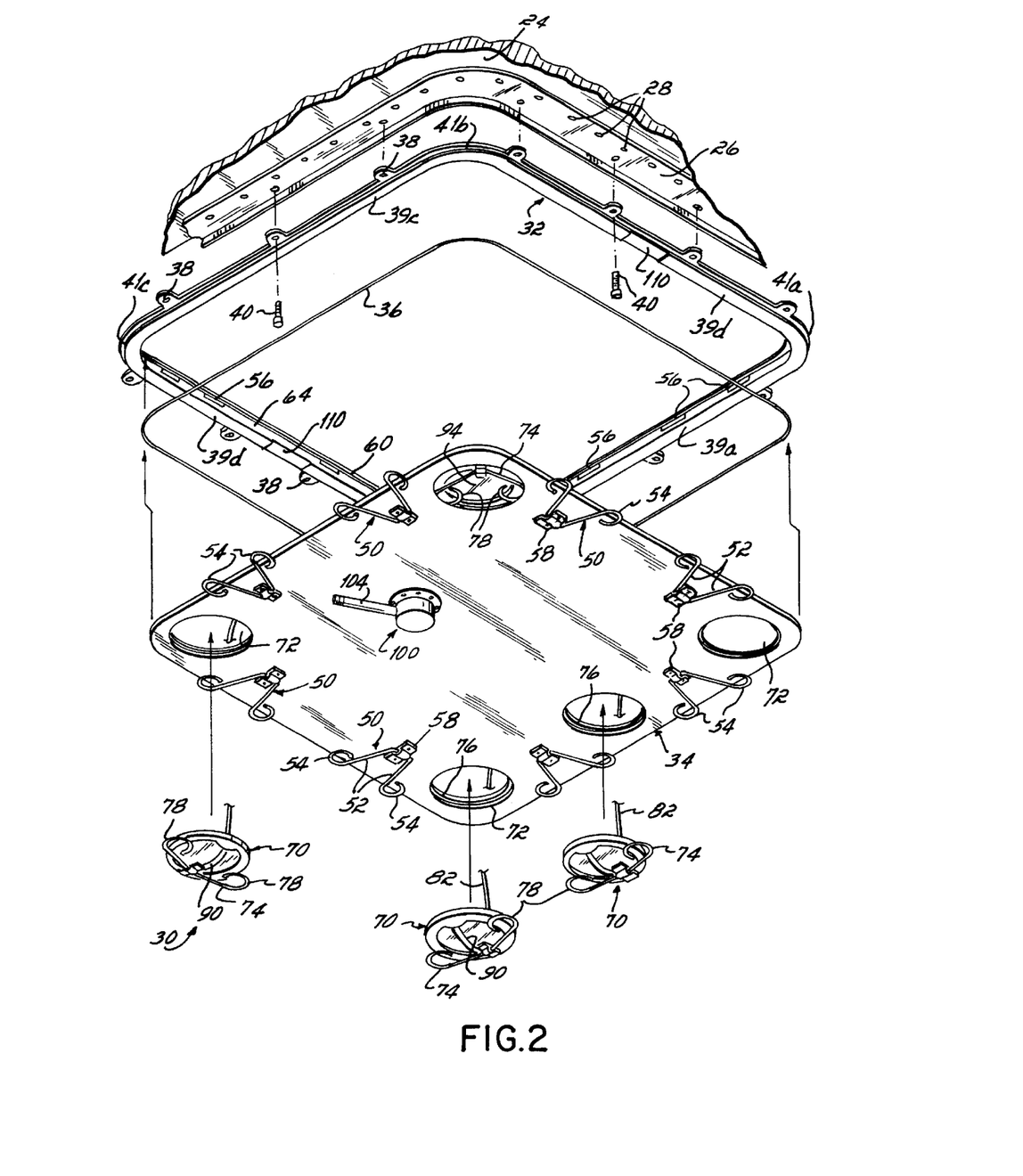
FIG. 2 is a perspective disassembled view of the helicopter drip pan apparatus of the invention shown attaching to the skirt around the structural opening.

As can be further appreciated the rotor transmission 16 as well as the engine 14 require various fluids during their respective operations. Generally, these fluids provide the rotor transmission 16 and the engine 14 with lubrication, cooling, and the like. During operation these fluids may leak and drip from either the engine 14 or rotor transmission 16 or both. To prevent leakage of fluid into the cabin 12 via structural opening 24, a drip pan apparatus 30, as shown in FIG. 2, is used to cover and seal the structural opening 24.

With specific reference to FIGS. 2–6, the drip pan apparatus 30 according to one preferred embodiment of the invention has a frame member 32, a drip pan 34, and a seal member 36 cooperating together to provide a fluid tight sealing arrangement for structural opening 24. Frame member 32 has a plurality of lugs 38 disposed about the exterior periphery of frame member 32. Four lugs 38 are disposed on two sides of the frame member 32 and three lugs 38 are disposed on the other two sides of the frame member 32. Fasteners 40 cooperating with lugs 38 and threaded retention members 42 (FIG. 4) secure frame member 32 to skirt 26 attached to structural opening 24. Once installed, frame member 32 typically remains in place and is not routinely removed from structural opening 24, although it could be readily removed by simply extracting fasteners 40. Frame member 32 is many times more rigid than the flexible skirt 26.

Drip pan 34 has a plurality of resilient members 50 which serve to hold drip pan 34 in sealing engagement with frame member 32. Each resilient member 50 has elongated arms 52 with curved portions 54. Resilient members 50 are free to pivot about brackets 58. Curved portions 54 selectively engage slots 56 opening toward and located about the interior periphery of frame member 32. To secure drip pan 34 to frame member 32, the drip pan 34 is pushed into the interior of frame member 32 until the drip pan 34 contacts lip 60 (FIG. 4) which extends around frame member 32 and acts as a stop for drip pan 34. Only part of the curved portions 54 are resiliently inserted into slots 60. The installation and the removal of the drip pan 34 can be accomplished rather quickly using the resilient members 50 because no tools such as screwdrivers or wrenches are required. Equally important, resilient members 50 are permanently secured to the drip pan 34 by brackets 58, so the resilient members 50 cannot be lost or misplaced when the drip pan 34 is removed to gain full access to the engine 14 and rotor transmission 16.

Figure 3:
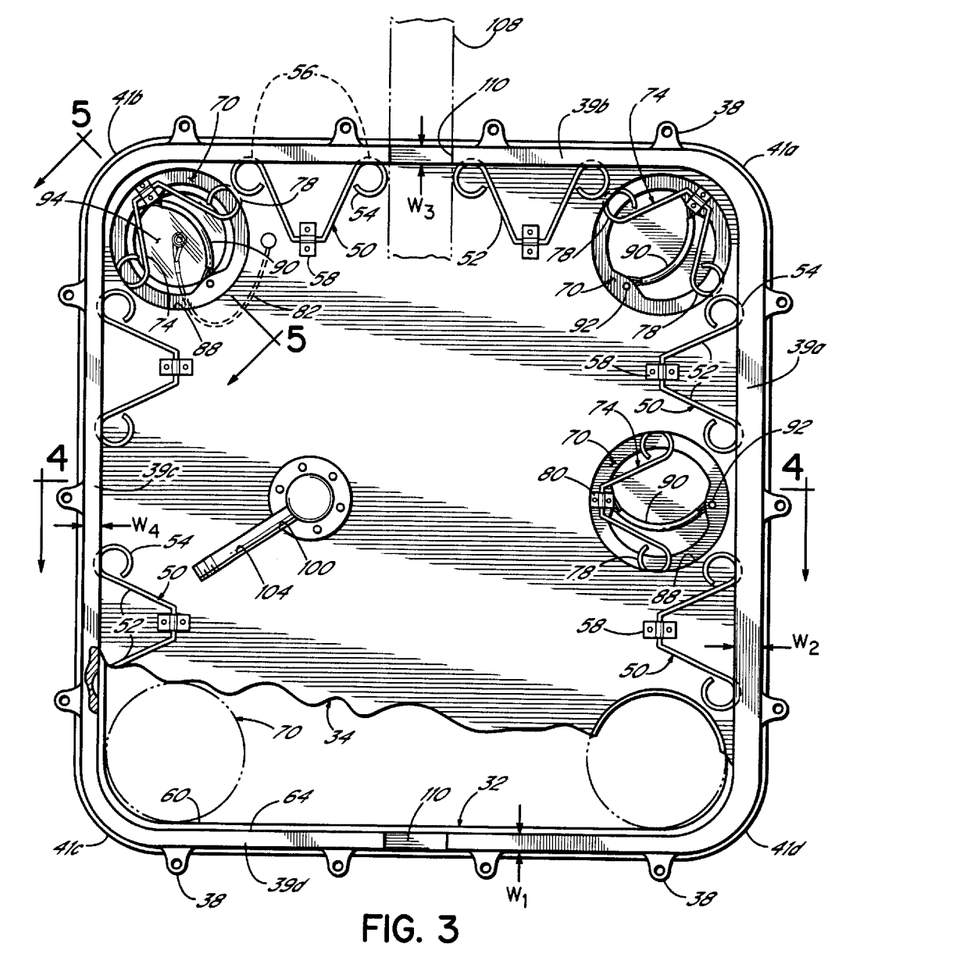
FIG. 3 is a top plan view of the assembled helicopter drain pan apparatus in partial cross section.

Seal member 36 is disposed in an outwardly-facing groove 62 which extends around the outer periphery of drip pan 34. In this application, outwardly-facing represents a direction substantial parallel to the plane of the drip pan 34 and extending away from the drip pan 34. As illustrated in FIGS. 2 and 3, the outer periphery of drip pan 34, which has four straight edges or side 35a, 35b, 35c, 36d connected by curved portions 37a, 37b, 37c, 37d, conforms to frame member 32 which is comprised of four straight sides or rails 39*a*, 39*b*, 39*c*, 39*d* connected by curved portions 41*a*, 41*b*, 41*c*, 41*d*. When drip pan 34 is installed into frame member 32, seal member 36 sealing engages inwardly-facing surface 64 of frame member 32 to achieve a fluid tight sealing arrangement between drip pan 34 and the frame member 32. In this application, inwardly-facing represents a direction substantial parallel to the plane of the frame member 32 and extending toward the interior of the frame member 32. Unexpectedly, seal member 36 provides the necessary sealing engagement between outwardly-facing seal member 36 and inwardly-facing surface 64 despite the fact that groove 62 and surface 64 respectively run along straight sides 35*a*, 35*b*, 35*c*, 36*d* and 39*a*, 39*b*, 39*c*, 39*d*. Typically, peripheral seals are used in cooperation with annular or curved sealing surfaces such as those defined by curved portions 37*a*, 37*b*, 37*c*, 37*d* and 41*a*, 41*b*, 41*c*, 41*d*. It was previously felt that peripheral seals used along straight sealing surfaces would provide unacceptable sealing integrity.

In one prior drip pan design, a seal was located in a groove opening in a direction perpendicular to the plane of the drip pan. The seal would engage a surface which was parallel to the plane the dip pan. With this arrangement, flexure of the helicopter frame associated with structural opening 24 may breach the seal integrity between the drip pan and the attachment frame causing fluid to leak into the helicopter cabin. Seal member 36 of the present invention, however, is a peripheral seal located in outwardly-facing groove 62 to form a fluid seal between the periphery of the drip pan 34 and the inwardly-facing surface 64 of frame member 32. With this arrangement, flexure of the helicopter frame associated with structural opening 24 does not breach the integrity of the sealing arrangement between the drip pan 34 and the frame member 32. It can be appreciated that while the sealing member 36 could be any suitable cross-sectional geometry, seal member 36 is preferably an O-ring.

Routine maintenance and inspection of the rotor transmission 16, does not ordinarily require removal of the entire drip pan 34. To accommodate limited access for routine maintenance or inspection, a plurality of small, removable access covers 70 are provided in drip pan 34 to allow access through access openings 72 to mechanical linkages in and around the rotor transmission and to allow inspection of the fluid levels associated with the rotor transmission 16. An access cover 70 for each access opening 72 is removably disposed in sealing engagement covering the access opening 72. To secure access cover 70 to the access opening 72 in drip pan 34, each access cover 70 has a resilient member 74 which functions much like resilient member 54 which secures the drip pan 34 to the frame member 32.

Access opening 72 has an annular groove 76 for resiliently receiving curved portion 78 of resilient member 74 to sealingly secure access cover 70 to access opening 72. Advantageously, no tools are required to operate the resilient members 74 to install or remove the access covers 70. In addition, brackets 80 permanently secure resilient member 74 to access covers 70 so resilient members 74 cannot be lost or misplaced. Each access cover 70 is attached to the drip pan 32 by a suitable attachment device such as a cable or chain 82 so when an inspection procedure is complete the access cover 70 is readily retrieved and positioned into access opening 72. Each access cover 70 includes a seal member 84 disposed in an annular groove 86 extending around the outer periphery of access cover 70. When access cover 70 is placed into access opening 72, seal member 84 sealing engages surface 88 of drip pan 34 which forms part of access opening 72. Like seal member 36, seal member 84 forms a peripheral seal between the access cover 70 and the surface 88. This arrangement improves on prior sealing arrangements which located the seal member between an access cover surface parallel to the plane of the access cover and the drip pan, i.e., a face seal. As discussed above, the peripheral seal arrangement provides improved seal integrity even if the drip pan 34 flexes. Preferably, seal member 84 is an O-ring.

To facilitate the removal of accessing covers 70 from access openings 72, pull handles 90 are attached to access covers 70. Fasteners 92 fixedly secured pull handles 90 to access covers 70. Preferably, pull handles 90 are cable or chain.

During the preflight procedure of a helicopter, critical filters must be checked and determined operational before the helicopter is allowed to fly. To facilitate this inspection process, at least one of the access covers 70 has a transparent cover member 94 (FIG. 5) so that a bypass button or valve associated with a particular filter can be checked visually through the access cover 70 without physically removing the access cover 70 from the access opening 72. A seal member 96 is dispose between the transparent cover member 94 and access cover 70 to prevent fluid leakage therebetween. Preferably, the transparent cover member 94 is made from acrylic such as Plexiglass™.

Figure 4:
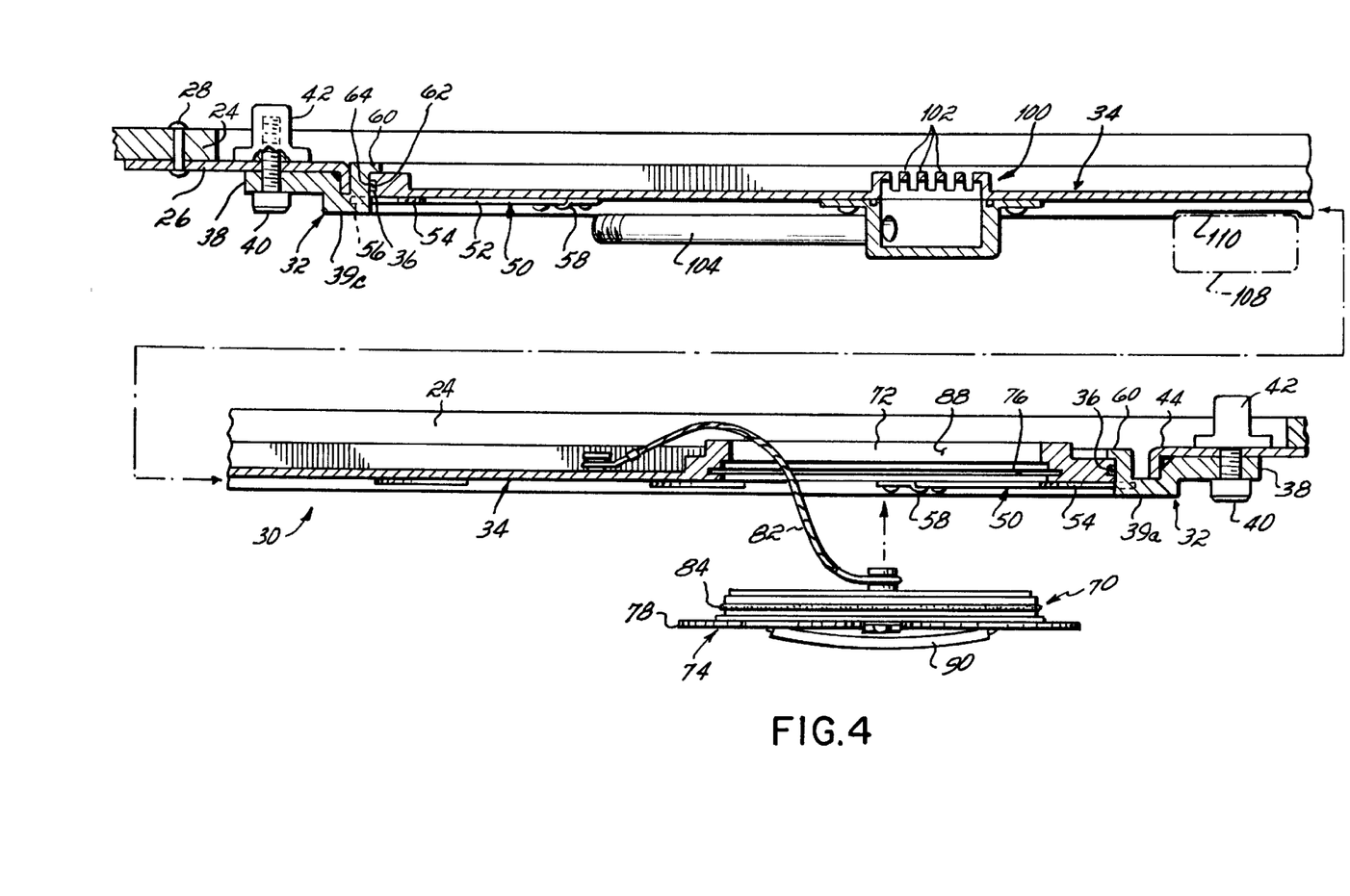
FIG. 4 is a cross-sectional view taken along lines 4—4 of FIG. 3 showing the drain pan apparatus in one assembled mode.
Figures 5, 6:
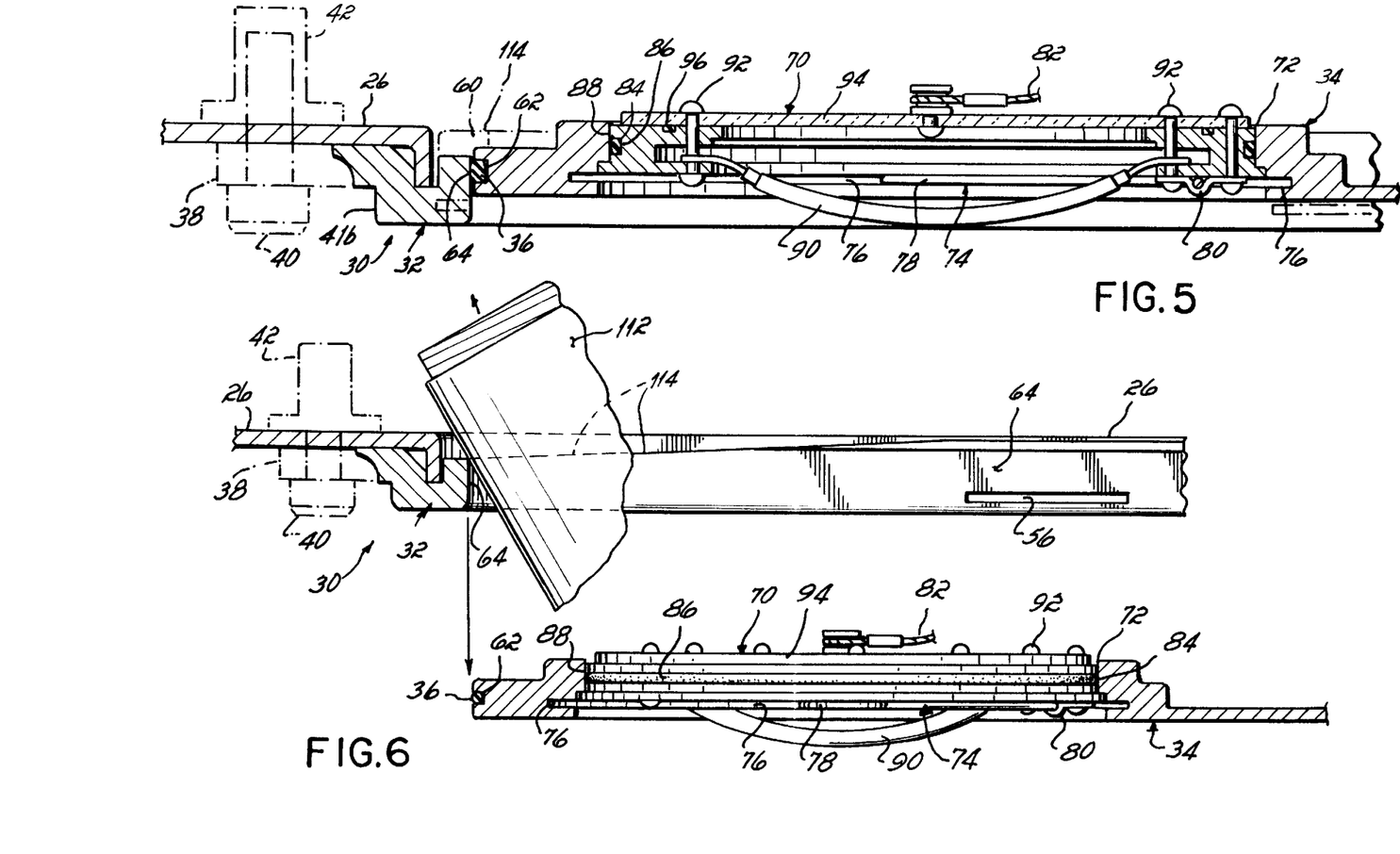
FIG. 5 is a cross-sectional view taken along lines 5—5 of FIG. 3 showing the drain pan apparatus in an assembled mode.
FIG. 6 is a cross-sectional view similar to that view shown in FIG. 5 illustrating the insertion of a filter from the engine compartment of the helicopter.

With reference to FIGS. 2–4, drip pan 34 has a drain hole 100 to drain fluid collected by the drip pan 34. Drain hole 100 includes strainer members 102 to keep foreign objects that may come to rest on the drip pan 34 from clogging the drain hole 100. A drain tube 104 may be attached to the drain hole 100 to direct the collected fluid to a catch basin (not shown) or to the exterior of the helicopter. The drain tube 104 is made preferably from metal tubing having a diameter of about 0.625 inches. Alternatively, a removable stopper could be used with drain hole 100 for selective drainage.

In at least one application, the drip pan apparatus 30 may be used on helicopters having carrousel bars added to the interior of the helicopter cabin 12 to support, for example, litters used for transporting patients in need of medical attention. Typically, at least one carrousel bar passes directly under the drip pan apparatus 34. To accommodate a carrousel bar 108 (phantom), elongated recesses 110 are provided in frame member 32 s o that the frame member 32 does not interfere with the installation and operation of the carrousel bar 108.

In still another application, the drip pan apparatus 30, and more specifically the frame member 32, may interfere with access to an oil filter associated with the rotor transmission 16 when the drip pan apparatus 30 is installed. To provide for removal of an oil filter 112 (FIG. 6) from the rotor transmission 16, a portion of frame member 32 is machined away as shown by numeral 114 so that the oil filter 112 can be removed along a line not perpendicular to the drip pan apparatus 30. During the removal or installation of oil filter 112, the drip pan 34 is removed to provide even greater access to the oil filter 112. Frame member 34 is machined just enough to permit removal of oil filter 112, and maintain sealing engagement between seal member 36 and surface 64 of frame member 34.

To provide further access to the oil filter 112, the geometry of frame member 32 can be modified. More specifically and with reference to FIG. 3, frame member 32 is comprised of four straight sides or rails 39*a*, 39*b*, 39*c*, 39*d* connected by curved portions 41*a*, 41*b*, 41*c*, 41*d*, where each rail 39*a*, 39*b*, 39*c*, 39*d* has a respective width indicated by W1, W2, W3, W4. To provide imporved access to the oil filter 112, the opening defined by rails 39*a*, 39*b*, 39*c*, 39*d* is shifted to the left in FIG. 3 such that the respective widths W1, W2, W3, W4 of rails 39a, 39b, 39c, 39d are not all equal to one another. Specifically, W1 equals W3, W4 is greater than W1 and W3, and W4 is less than W1 and W3. Preferably, the difference between W2 and W4 is about one quarter of an inch. This transverse shift of the opening helps to accommodate removal of the oil filter 112 which is generally located in the compartment above the drip pan apparatus 30 near the upper left hand corner of the drip pan apparatus 30 shown in FIG. 3.

Accordingly, the invention provides an improved cover and seal for the interior access opening of a helicopter such as the Blackhawk™ helicopter. As such, the drip pan apparatus of the invention seals against fluid passage from the engine or transmission compartment to the cabin section of a helicopter. In addition, the drip pan apparatus of the invention permits quick access to the engine or transmission compartment of a helicopter, such as the Blackhawk™, without requiring modification to the existing aircraft structure.

These and other embodiments and modifications will become readily apparent to those of ordinary skill in the art without departing from the scope of this invention and the applicant intends to be bound only by the claims appended hereto.

What is claimed is:

1. A helicopter drip pan apparatus for covering and sealing a structural opening in a helicopter, the drip pan apparatus comprising:
   a frame member adapted to mount to the structural opening of the helicopter, said frame member having an inwardly-facing peripheral surface extending around said frame member, said surface having at least one linear portion;
   a drip pan having an outwardly-facing peripheral groove extending around said drip pan, said groove having at least one linear portion, said drip pan being selectively affixed to said frame member; and
   a seal member disposed in said groove of said drip pan sealingly engaging said surface of said frame member against fluid leakage therethrough.

2. The drip pan apparatus of claim 1, wherein said drip pan further comprises:
   at least one access opening; and
   a removable access cover selectively disposed in sealing engagement with said access opening.

3. The drip pan apparatus of claim 2, wherein at least one of said access covers has a transparent cover member to permit visual inspection into the structural opening without removal of said access cover.

4. The drip pan apparatus of claim 2, wherein said access opening includes a groove therein, said access cover includes a resilient member resiliently engaging said groove to detachably secure said access cover to said access opening.

5. The drip pan apparatus of claim 1, wherein said drip pan includes a drain hole through which collected fluid may drain therethrough.

6. The drip pan apparatus of claim 5 further comprising a drain tube attached to said drain hole.

7. The drip pan apparatus of claim 1, wherein said frame member is comprised of four linear frame rails each having a respective width, said opening in said frame member being transversely disposed such that the respective widths of two oppositely disposed frame rails are substantially equal, the width of one of the other frame rails is wider than the two oppositely disposed frame rails and the width of the remaining frame rail is narrower than the two oppositely disposed frame rails.

8. A helicopter drip pan apparatus for covering and sealing a structural opening in a helicopter, the drip pan apparatus comprising:
   a frame member adapted to mount to the structural opening of the helicopter, said frame member having an inwardly-facing peripheral surface extending around said frame member, said frame member also having spaced-apart slots opening inwardly to an opening defined by said frame member;
   a drip pan having an outwardly-facing peripheral groove extending around said drip pan, said drip pan having a plurality of resilient members resiliently engaging said slots to detachably secure said drip pan to said frame member; and
   a seal member disposed in said peripheral groove to sealingly engage said surface of said frame member against fluid leakage therethrough.

9. The drip pan apparatus of claim 8, wherein said drip pan further comprises:
   at least one access opening; and
   a removable access cover selectively disposed in sealing engagement with said access opening.

10. The drip pan apparatus of claim 9, wherein at least one of said access covers has a transparent cover member to permit visual inspection into the structural opening without removal of said access cover.

11. The drip pan apparatus of claim 9, wherein said access opening includes a groove therein, said access cover includes a resilient member resiliently engaging said groove to detachably secure said access cover to said access opening.

12. The drip pan apparatus of claim 8, wherein said drip pan includes a drain hole through which collected fluid may drain therethrough.

13. The drip pan apparatus of claim 12 further comprising a drain tube attached to said drain hole.

14. The drip pan apparatus of claim 8, wherein said frame member is comprised of four linear frame rails each having a respective width, said opening in said frame member being transversely disposed such that the respective widths of two oppositely disposed frame rails are substantially equal, the width of one of the other frame rails is wider than the two oppositely disposed frame rails and the width of the remaining frame rail is narrower than the two oppositely disposed frame rails.

15. A helicopter structure including in combination a rotor transmission, a rotor transmission access opening, and a drip pan in sealing engagement with said access opening, the drip pan apparatus comprising:
   a frame member adapted to mount to the structural opening of the helicopter, said frame member having an inwardly-facing peripheral surface extending around said frame member, said frame member also having spaced-apart slots opening inwardly to an opening defined by said frame member;
   a drip pan having an outwardly-facing peripheral groove extending around said drip pan, said drip pan having a plurality of resilient members resiliently engaging said slots to detachably secure said drip pan to said frame member; and
   a seal member disposed in said peripheral groove to sealingly engage said surface of said frame member against fluid leakage therethrough.

16. The drip pan apparatus of claim 15, wherein said drip pan further comprises:

at least one access opening; and a removable access cover selectively disposed in sealing engagement with said access opening.

17. The drip pan apparatus of claim 16, wherein said access opening includes a groove therein, said access cover includes a resilient member resiliently engaging said groove to detachably secure said access cover to said access opening.

18. The drip pan apparatus of claim 15, wherein said frame member is comprised of four linear frame rails each having a respective width, said opening in said frame member being transversely disposed such that the respective widths of two oppositely disposed frame rails are substantially equal, the width of one of the other frame rails is wider than the two oppositely disposed frame rails and the width of the remaining frame rail is narrower than the two oppositely disposed frame rails.

19. A method of installing a helicopter drip pan apparatus to a helicopter structure where the helicopter has a rotor transmission, a rotor transmission access opening, the drain pan apparatus including a frame member having slots, a drip pan having an outwardly-facing peripheral groove and a plurality of resilient members, and a seal member disposed is said peripheral groove, the method comprising the steps of:

attaching the frame member to the structural opening;

inserting said drain pan into said frame such that said seal member sealingly engages said frame member against fluid leakage therethrough; and engaging said slots with said resilient members to detachably secure said drip pan in sealing engagement with said frame member.

\* \* \* \* \*